US010839590B2

(12) United States Patent
Johansson et al.

(10) Patent No.: US 10,839,590 B2
(45) Date of Patent: Nov. 17, 2020

(54) GUTTER SPACE PADDING FOR TEXTURE ATLASES

(71) Applicant: Microsoft Technology Licensing, LLC, Redmond, WA (US)

(72) Inventors: Erik Gustaf Anders Johansson, Linköping (SE); Fredrik Carl Anders Ljung Larhed, Linköping (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/036,931

(22) Filed: Jul. 16, 2018

(65) Prior Publication Data

US 2020/0020150 A1 Jan. 16, 2020

(51) Int. Cl.
*G06T 15/04* (2011.01)
*G06T 17/20* (2006.01)
*G06T 7/49* (2017.01)

(52) U.S. Cl.
CPC ............. *G06T 15/04* (2013.01); *G06T 7/49* (2017.01); *G06T 17/205* (2013.01); *G06T 2210/36* (2013.01)

(58) Field of Classification Search
CPC ... G06T 15/04; G06T 17/205; G06T 2200/04; G06T 2200/28; G06T 9/001; G06T 2210/36; G06T 7/49
USPC ......................................................... 345/582
See application file for complete search history.

(56) References Cited

U.S. PATENT DOCUMENTS

| 7,605,820 | B1 | 10/2009 | Rogers et al. | |
| 2009/0208110 | A1* | 8/2009 | Hoppe | G06T 9/00 382/190 |
| 2014/0333621 | A1* | 11/2014 | Hillesland | G06T 15/04 345/423 |
| 2017/0365069 | A1* | 12/2017 | Dupont | G06T 9/001 |
| 2018/0144535 | A1* | 5/2018 | Ford | G06T 15/005 |

OTHER PUBLICATIONS

Sylvain Lefebvre and Hugues Hoppe. 2006. Appearance-space texture synthesis. ACM Trans. Graphics, 25 (2006), pp. 541-548. (Year: 2006).*
Polycount, "Edge Padding", http://wiki.polycount.com/wiki/Edge_padding, Jun. 10, 2017, pp. 1-2. (Year: 2017).*

(Continued)

*Primary Examiner* — Jin Cheng Wang

(57) ABSTRACT

Systems and methods are disclosed for rendering a surface in a synthetic scene using gutter space padding for texture atlases. Gutter space adjacent to UV shells may be padded with texels from the UV shells used for neighboring surfaces, rather than merely extending the interior texels. The result is that distracting artifacts, caused by mesh downsampling that produces sub-optimal polygon shapes and vertex placement may be mitigated. The resulting rendering, manifesting lessened artifacts, may appear to be less impacted by downsampling, and thus improve the experience for the viewer or other synthetics data consumer. The improvement may be used in rendering for human users and also training neural networks in computer vision tasks, such as object detection and recognition.

20 Claims, 10 Drawing Sheets

(56) References Cited

OTHER PUBLICATIONS

F. Gonzalez, et al., "Continuity Mapping for Multi-Chart Textures", http://ggg.udg.edu/publicacions/UsersWebs/continuityMapping/continuityMapping.pdf, Jun. 22, 2013, pp. 1-8 (Year: 2013).*

Purnomo, B., Cohen, J. D., and Kumar, S. 2004. Seamless texture atlases. In SGP '04: Proceedings of the 2004 Eurographics/SIGGRAPH symposium on Geometry Processing, 65-74. (Year: 2004).*

"Edge Padding", Retrieved from: http://wiki.polycount.com/wiki/Edge_padding, Retrieved on: Apr. 17, 2018, 2 Pages.

"International Search Report and Written Opinion Issued in PCT Application No. PCT/US2019/039361", dated Aug. 23, 2019, 13 Pages.

Pages, et al., "Seamless, Static Multi-Texturing of 3D Meshes", In Journal of the Computer Graphics Forum, vol. 34, Issue, Feb. 2015, pp. 228-238.

\* cited by examiner

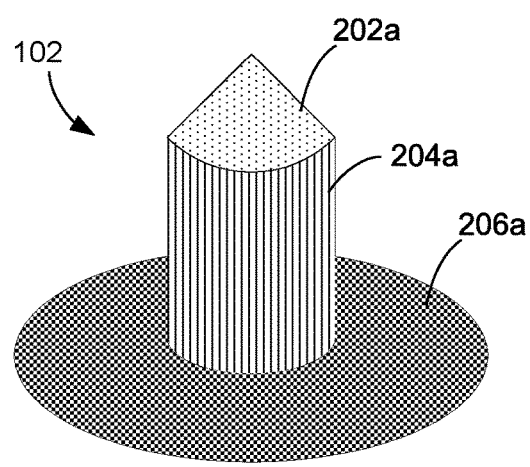 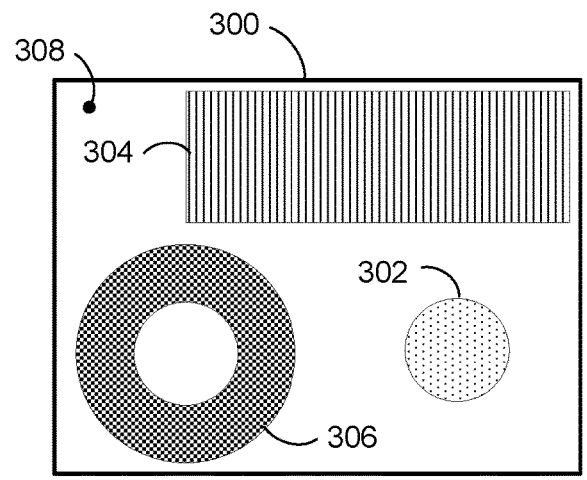
FIG. 3A  FIG. 3B
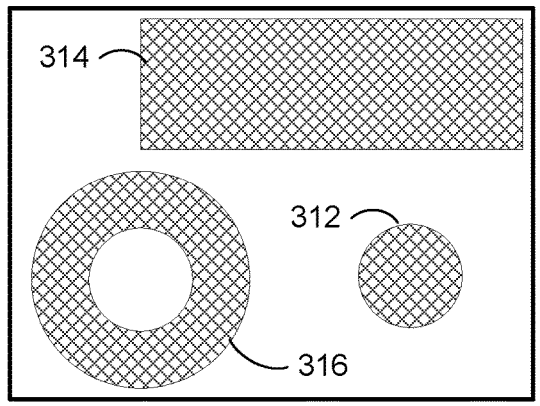 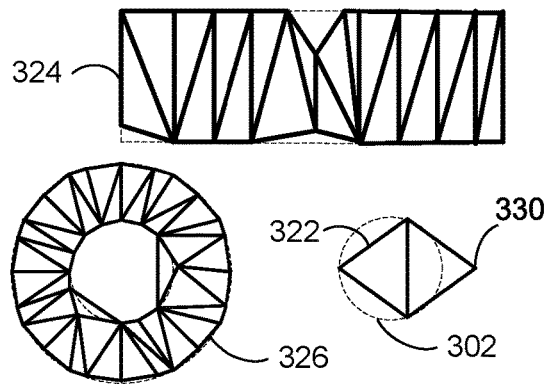
FIG. 3C  FIG. 3D

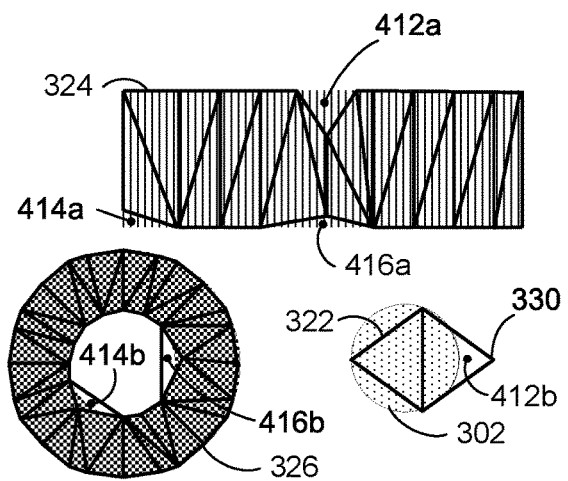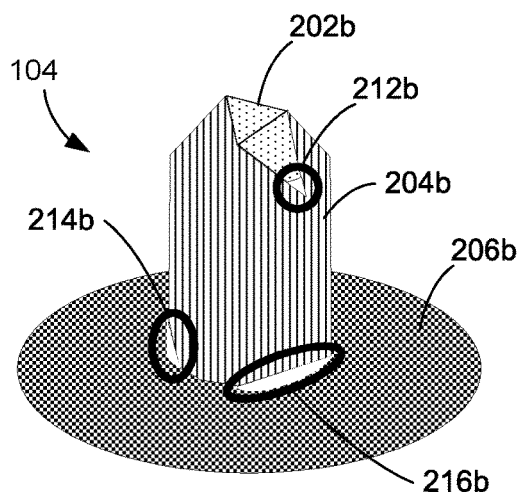
FIG. 4A　　　　　　　FIG. 4B
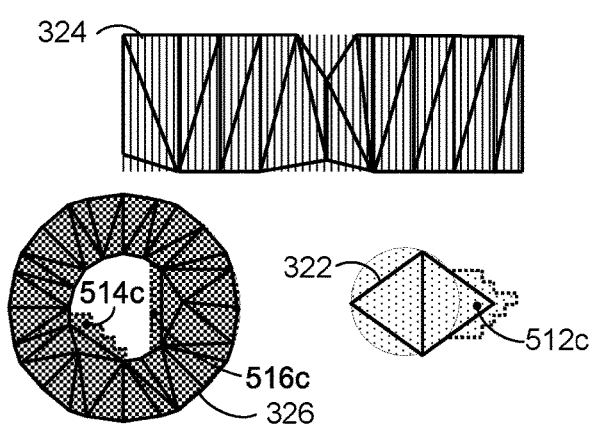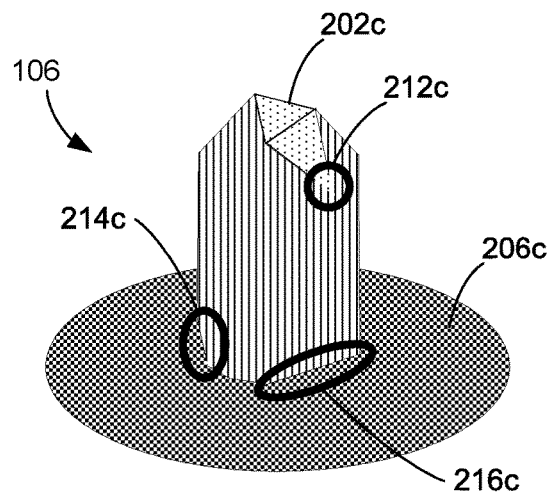
FIG. 5A　　　　　　　FIG. 5B

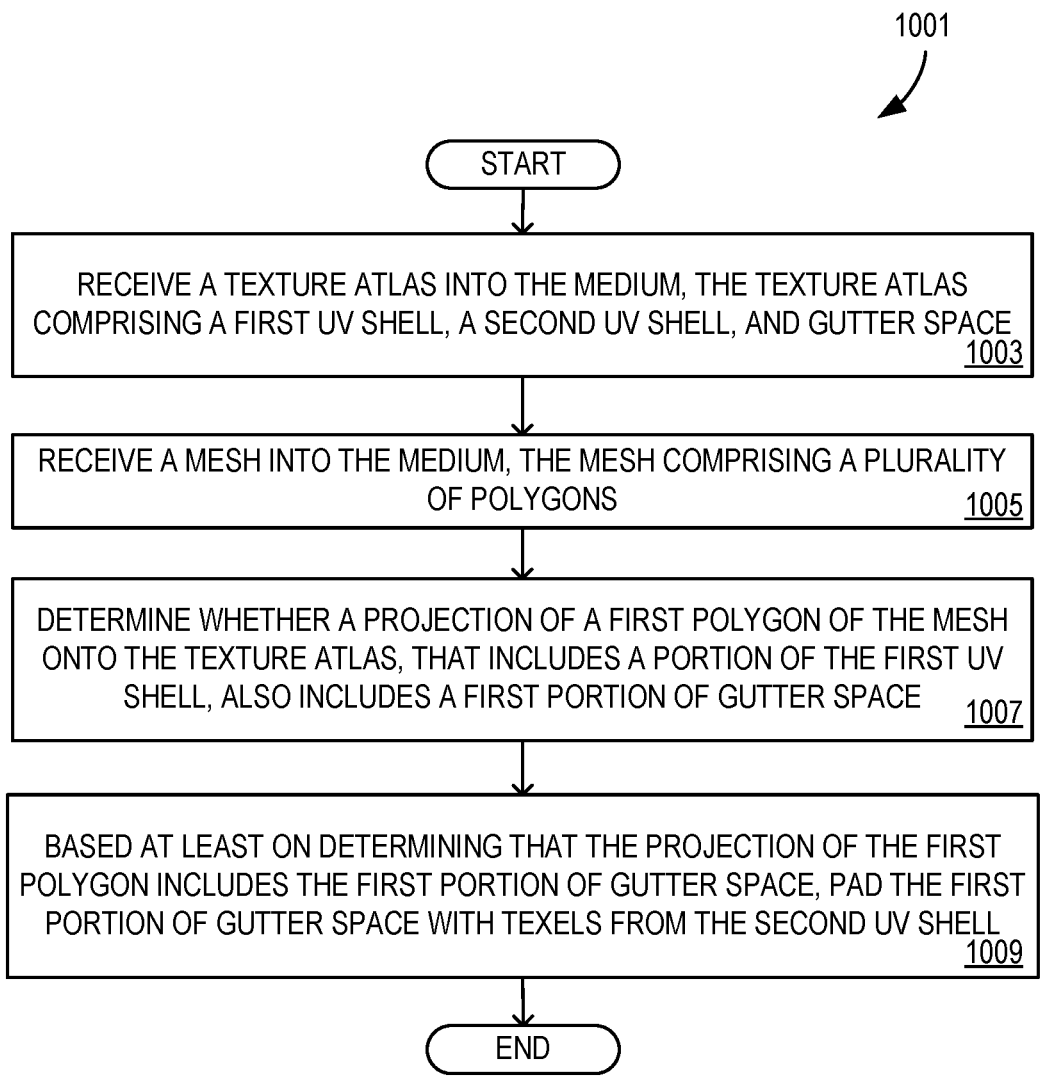

GUTTER SPACE PADDING FOR TEXTURE ATLASES

BACKGROUND

Synthetic scene rendering operations, such as used in game models, may use a texture atlas to supply detail for object surfaces, without having to model the detail as independent objects. This can improve the rate at which frames are generated, enabling creation modification, and navigation through synthetic scenes in real-time. A common form of a texture atlas places multiple regions of texture information in the form of texture pixels (referred to as texels) in a single bitmap file. The regions may be referred to as UV shells, because they are specified using U and V texture coordinates. Within the texture atlas bitmap, the blank regions between the UV shells is often referred to as the gutter. The portion of the atlas used by the gutter (referred to as gutter space) may be set, at the time the atlas is created, as a solid color such as white, gray, or black.

A synthetic or virtual three-dimensional (3D) object may be defined using a mesh of polygons, often triangles. The vertices of the polygons often contain UV coordinates which are used to specify the particular texel to use when rendering the object in a scene. The two-dimensional (2D) texture from the atlas is then be stretched over a 3D mesh. Although any polygons may be used for an artist to create a synthetic 3D object, triangles are a common choice for rendering meshes because many hardware arrangements e.g., graphics cards) are optimized for triangles. When a 3D model is imported into a rendering game engine, and polygons are converted into triangles, some of the triangles may have sub-optimal shapes that result in poor rendering.

When an object is rendered for an up-close or near-field view, it may use the highest resolution of the mesh. However, when the object is rendered at a relatively far virtual distance or the object is moving quickly across the scene so that loss of detail may not be noticeable by a user, the highest resolution of the mesh may not be needed, and the mesh may then be downsampled. Downsampling may also occur, even when the loss of detail may be noticeable, if the frame rate drops below some threshold, and might result in scene motion that appears hesitant and jerky to a viewer. A level-of-detail (LOD) model is a lower-resolution version of a synthetic object that may be rendered more quickly. LOD0 typically refers to the highest level of detail; while LOD1 is the first lower level of resolution; LOD2 is the next lower level of resolution; and so on. A common LOD scheme may drop resolution by 50% for each level, for example from 2048 pixels to 1024, then to 512, then to 256, etc. Different LODs may use different texels, to prevent distracting artifacts that may occur with common nearest-neighbor or averaging downsampling operations. If different texels are used for the different LODs, the set of UV shells corresponding to the differing LODs may be referred to as mipmaps.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and examples disclosed herein are directed to rendering a surface in a synthetic scene comprises: receiving a texture atlas into the medium, the texture atlas comprising a first UV shell, a second UV shell, and gutter space; receiving a mesh into the medium, the mesh comprising a plurality of polygons; determining whether a projection of a first polygon of the mesh onto the texture atlas, that includes a portion of the first UV shell, also includes a first portion of gutter space; and based at least on determining that the projection of the first polygon includes the first portion of gutter space, padding the first portion of gutter space with texels from the second UV shell.

BRIEF DESCRIPTION OF THE DRAWINGS

The disclosed examples are described in detail below with reference to the accompanying drawing figures listed below:

FIGS. 3A-3D illustrate various aspects of an example rendering operation using a texture atlas;

FIGS. 4A-4B illustrate aspects of an example rendering operation using a texture atlas and edge padding in the gutter space;

FIGS. 5A-5B illustrate aspects of an example rendering operation using a texture atlas and a first form edge padding in the gutter space;

FIGS. 10A-10B are flow charts illustrating exemplary operations involved in rendering a surface in a synthetic scene using a texture atlas.

Corresponding reference characters indicate corresponding parts throughout the drawings.

DETAILED DESCRIPTION

Figure 1A:
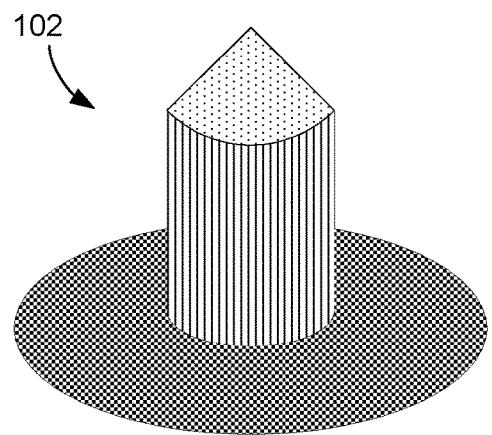
FIGS. 1A-1D illustrate example renderings of a virtual object using a texture atlas.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Systems and methods are disclosed for rendering a surface in a synthetic scene using a gutter space improvement for texture atlases. Gutter space adjacent to UV shells may be padded with texels from the UV shells used for neighboring surfaces, rather than merely extending the interior texels. The result is that distracting artifacts, caused by mesh downsampling that produces sub-optimal polygon shapes and vertex placement may be mitigated. The resulting rendering, manifesting lessened artifacts, may appear to be less impacted by downsampling, and thus improve the experience for the viewer or other synthetics data consumer. The improvement may be used in rendering for human users and also training neural networks in computer vision tasks, such as object detection and recognition. Further, the padding as described herein improves the functioning of a computing device by using less computing resources (e.g., memory and processing) by enabling consumption of suitable downsampled images. As such, the disclosure operates in an unconventional manner to enable improved rendering by padding the gutter space in a texture atlas as described herein, thereby improving the user experience, among other things.

When an object is rendered with a higher-order level-of-detail (LOD) (e.g., lower resolution), there may be distracting artifacts resulting from the vertices of the mesh falling outside of a UV shell, or part of a polygon including gutter space adjacent to a concave region of a UV shell (e.g., when the detail of the concavity is lost in the lower resolution). In these situations, the pixels from the gutter space may then be mapped into the rendering of the affected polygons.

Mipmaps are used as in some rendering arrangements because, when rendered resolution is below the texel resolution, texel downsampling is needed. This is different than downsampling the mesh. Unfortunately, common fast texel downsampling methods, such as nearest neighbor or averaging, produce distracting non-linear effects, perceived as shimmering or unfavorable colors by viewers. When mipmaps are automatically generated, if the mipmaps are anything but perfectly rectangular, with the pixel dimensions being exactly an integer power of two, then the texel downsampling includes gutter pixels. The gutter space pixels thus bleed into the rendering when generating mipmaps Thus, gutter space pixels can bleed into the rendering of texels in two situations: (1) when the downsampled mesh maps to an area outside a UV shell, and (2) when generating mipmaps. The result, whichever the cause, may be a noticeable artifact that is distracting to the viewer whenever the gutter space properties are inconsistent with the affected texels. One way to alleviate the impacts of this phenomenon is to pad the gutter space.

Edge padding around a UV shell forms a "skirt" of pixels that results in producing better texels than the blank, single-color default gutter pixel color. This requires, however, that sufficient space is reserved between UV shells to allow for padding. Aspects of the disclosure reserve sufficient gutter space around each UV shell to allow for the maximum dimension of padding that may be needed. One approach is to use a fixed number of pixels or a number that is based on the dimensions of the atlas. For example, a padding width may be $\frac{1}{128}$th the pixel dimensions of an atlas, so that 2048×2048 reserves 16 pixels in each direction past the edge of a UV shell, 1024×1024 reserves 8 pixels, 512×512 reserves, 4 pixels, and 256×256 or smaller reserves 2 pixels. The gutter space should be wide enough to accommodate the padding reservations between adjacent texels, which would be $\frac{1}{64}$th of the atlas dimensions, using the padding width approach described. For adjacent texels of the same size, the gutter space width between the texels should be twice the padding reservation; padding may then go out to half the gutter space width in such an arrangement. The padding, as described herein, is implemented in a manner that minimizes artifacts resulting from downsampling and possible suboptimal polygon shaping and vertex placement.

Figure 1B:
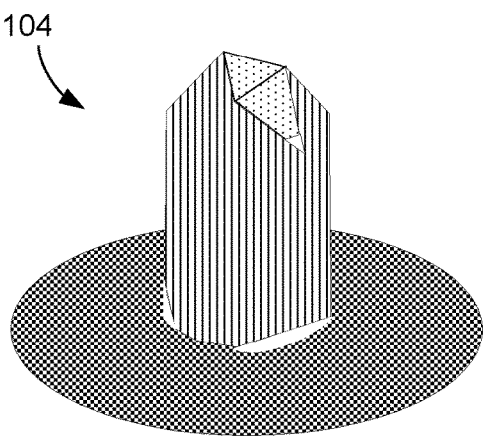
Figure 1C:
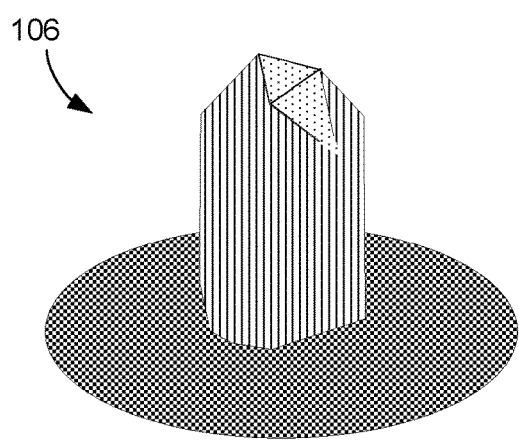
Figure 1D:
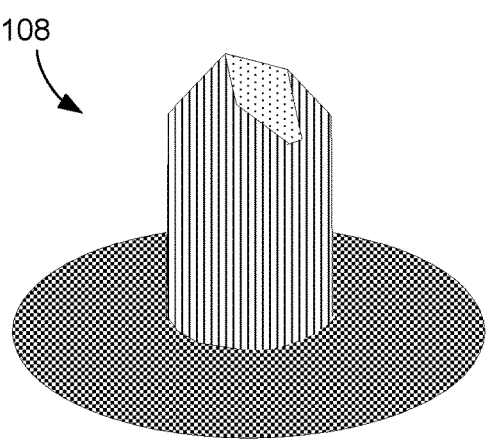
Figure 2A:
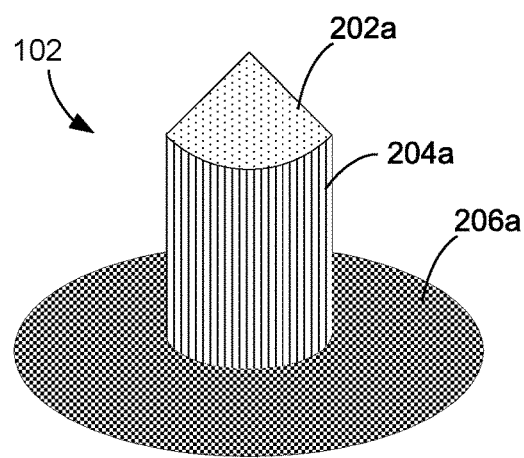
FIGS. 2A-2D provide example annotations for the illustrations of FIGS. 1A-1D.
Figure 2B:
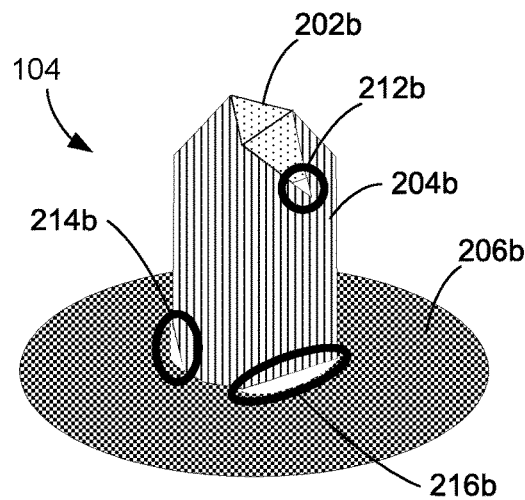

FIGS. 1A-1D illustrate renderings of a virtual object using a texture atlas, and FIGS. 2A-2D provide annotations for the illustrations of FIGS. 1A-1D. FIGS. 1A-2D should be viewed together. FIGS. 1A and 2A show a high resolution rendering of an object 102 that comprises a cone 202a sitting atop a closed-top cylinder 204a, which is sitting on a circular disk base 206a. FIGS. 1B and 2B show a reduced resolution rendering 104 of object 102. To better illustrate the advantages of the disclosure, the resolution has been drastically reduced. Cone 202a now is modeled by a set 202b of only two triangles, and thus has lost its characteristic shape.

The two triangles of the mesh (set of triangles 202b) have a vertex that extends past the original edge of cone 202a, and extend virtually into cylinder 204a, which is shown with a lower resolution rendering 204b. Because the vertex of set of triangles 202b extends past the edge of cone 202a, the mapping of the texture atlas, illustrated in more detail in FIGS. 4A and 4B, for cone 202a includes pixels from the gutter space of the texture atlas. No padding is used, and because the gutter space is white, a white region, devoid of the texture of either cone 202a or cylinder 204a, is apparent in indicated region 212b. As described above, when a vertex of a mesh falls outside of a UV shell, artifacts may result. Indicated region 212b provides an example.

Also as described above, artifacts may appear when part of a polygon includes gutter space adjacent to a concave region of a UV. The intersection of lower resolution rendering 204b of cylinder 204a with lower resolution rendering 206b of circular disk base 206a illustrates this phenomenon with indicated regions 214b and 216b. In indicated regions 214b and 216b, the artifacts result from polygons on the concave (interior) border of lower resolution rendering 206b including pixels from gutter space inside the UV space corresponding to circular disk base 206a, also illustrated in more detail in FIGS. 4A and 4B.

Figure 2C:
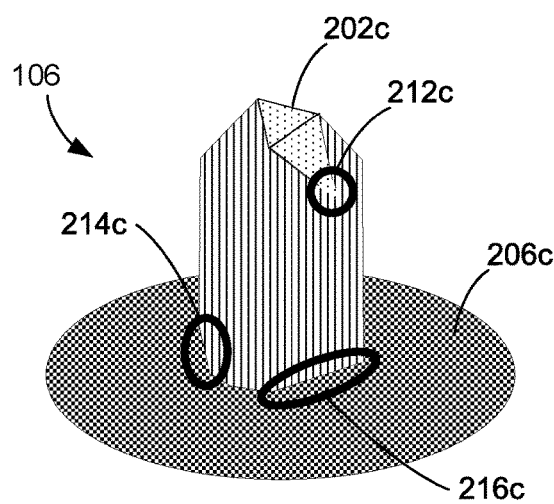

FIGS. 1C and 2C show a reduced resolution rendering 106 of object 102, although with edge padding that extends the interior of the texel region past the original borders of the UV shells. More detail is shown on this method in FIGS. 5A and 5B. Cone 202a is modeled by a set 202c of only two triangles, and thus has lost its characteristic shape. Triangle set 202c is shaped similarly to set 202b (of FIG. 2B), but is instead rendered using texel padding. Indicated region 212c thus is filled with texels of cone 202a, rather than white gutter space. Although this may be an improvement over indicated region 212b (of FIG. 2B), it improperly extends the texture of cone 202a beyond the proper boundary. This may be noticeable by some viewers, and may be unpleasantly distracting. One possible negative scenario may result in the improper training of computer vision artificial intelligence (AI), if the neural network trains on images containing artifacts that will not occur in real-world imagery collections. Indicated regions 214c and 216c, disposed at the intersection of lower resolution rendering 204c of cylinder 204a with lower resolution rendering 206c of circular disk base 206a, do not show white gutter space pixels, but the padding does highlight the block-like nature of the lower mesh resolution.

Figure 2D:
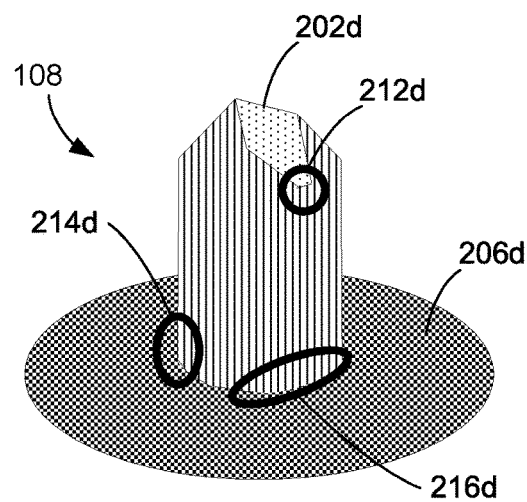

FIGS. 1D and 2D show a reduced resolution rendering 106 of object 102, although using a gutter space improvement for texture atlases as described herein. Gutter space adjacent to UV shells in this example is padded with texels from the UV shells used for neighboring surfaces, rather than extending the interior texels like the renderings of FIGS. 1C and 2C. More detail is shown on this method in FIGS. 6A and 6B. Cone 202a is modeled by a set 202d of only two triangles, as with the other reduced resolution renderings. Triangle set 202c is shaped similarly to sets 202b and 202c (of FIGS. 2B and 2C), but yet keeps the proper boundary of cone 202a and masks the negative consequences of a mesh vertex lying outside the UV shell for cone 202a. Additionally, indicated regions 2142d and 216d, disposed at the intersection of lower resolution rendering 204d of cylinder 204a with lower resolution rendering 206d of circular disk base 206a, at least somewhat mask the block-like nature of the lower mesh resolution.

It is therefore now possible to present the viewer with the appearance of a resolution that is higher than the actual mesh resolution by using the disclosed gutter space improvement for texture atlases.

FIGS. 3A-3D illustrate various aspects of a rendering operation using a texture atlas. FIG. 3A is a duplicate of FIG. 2A for the reader's convenience. FIG. 3B shows the texture atlas 300 used in the rendering of object 102. A UV space 302 corresponds to cone 202a; a UV space 304 corresponds to cylinder 204a; and a UV space 304 corresponds to circular disk base 206a. During a rendering operation, a three dimensional (3D) mesh of polygons, which may or may not be comprised of triangles, is effectively projected onto two-dimensional (2D) UV spaces to create a mapping. The pixels corresponding to the 3D rendering are then pulled from the texels of the UV spaces to populate the pixels in the 3D rendering. For cylinder 204a, for example, UV space 304 is effectively wrapped around a cylindrical shape. For cone 202a, for example, UV space 302 is stretched downward from "above" the conical shape, with the vertex of cone 202a mapping to the center of UV space 302. In texture atlas 300, the gutter space 308 is shown as white, although different colors, and even some textures, may be used for gutter spaces.

FIG. 3C illustrates one such projection of a mesh with diamond-shaped polygons onto the UV spaces, creating mesh projections 312, 314, and 316. FIG. 3D illustrates the effect of using a lower resolution mesh, comprised of triangles. As can be seen in FIG. 3D, a vertex 330 of a mesh projection 322 (comprised of two triangles, as described above for FIGS. 2B, 2C, and 2D) extends beyond the boundary of UV space 302. Also, as can be seen in FIG. 3D, mesh projections 324 and 326 have lower resolutions than mesh projections 314 and 316. This results in regions in which part of some polygons include gutter space, as explained in more detail in FIGS. 4A-6A.

FIGS. 4A-4B illustrate aspects of a rendering operation using a texture atlas and edge padding in the gutter space. FIG. 4A shows the texels in mesh projections 322, 324 and 326, while FIG. 4B is a duplicate of FIG. 2B for the reader's convenience. As can be seen in FIG. 4A, a region 412b, that is within the area defined by mesh projection 322, lies outside of UV space 302, due to the position of vertex 330. By default, region 412b is filled with pixels from the gutter space (described earlier as being white). This position maps to indicated region 212b. A better rendering would map the texels of an unused section 412a to indicated region 212b, but because the mesh does not map to section 412a, the rendering engine does not use texels from there.

Also, shown are regions 414b and 416b where a triangle of mesh projection 326 has spanned across a concave boundary section of the UV space 306 (see FIG. 3B). The pixels in these regions also map to white gutter space, and result in the white spaces of indicated regions 214b and 216b. These white spaces could have been avoided, if the rendering engine had known to use texels from unmapped portion 414a and 416a.

FIGS. 5A-5B illustrate aspects of a rendering operation using a texture atlas and a first form edge padding in the gutter space. FIG. 5A shows the texels in mesh projections 322, 324 and 326, while FIG. 5B is a duplicate of FIG. 2C for the reader's convenience. The edge padding indicated in FIGS. 5A-5B extends the texels from the interior of a UV space past the original borders of the UV space. For, example, as can be seen in FIG. 5A, the entirety of a region 512c that extends at least to include the entirety of mesh projection 322, and then some margin beyond that, is populated by copying the interior texels. This scheme is also used for regions 514c and 516c. These padded regions are then mapped to the corresponding indicated regions 212c, 214c, and 216c.

Figure 6A:
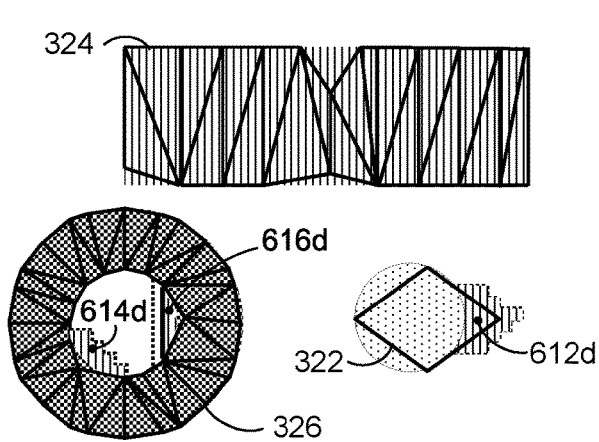
FIGS. 6A-6B illustrate aspects of an example rendering operation using a gutter space improvement for texture atlases.
Figure 6B:
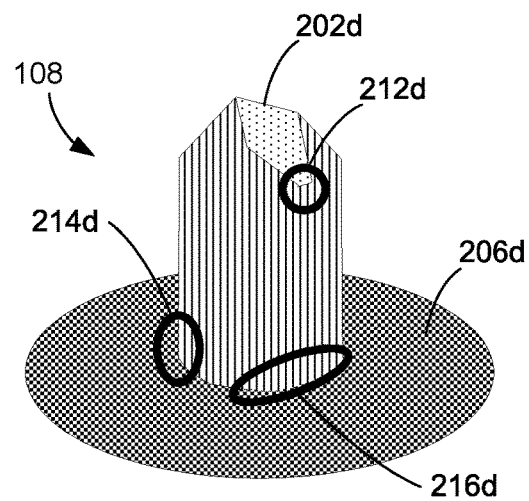

FIGS. 6A-6B illustrate aspects of a rendering operation using a gutter space improvement for texture atlases. FIG. 6A shows the texels in mesh projections 322, 324 and 326, while FIG. 6B is a duplicate of FIG. 2D for the reader's convenience. The edge padding indicated in FIGS. 6A-6B uses the texels from UV space 304 (see FIG. 3B) in padded regions 612d, 614d, and 616d, rather than merely extending the interior UV space texels. As a result, the corresponding indicated regions 212d, 214d, and 216d appear more natural, with less manifestation of artifacts from the decrease in resolution.

Figure 7A:
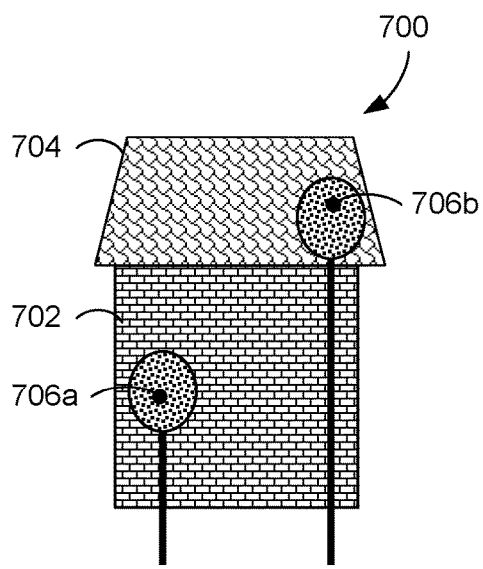
FIGS. 7A-7B illustrate aspects of an example rendering operation under extended operating conditions.
Figure 7B:
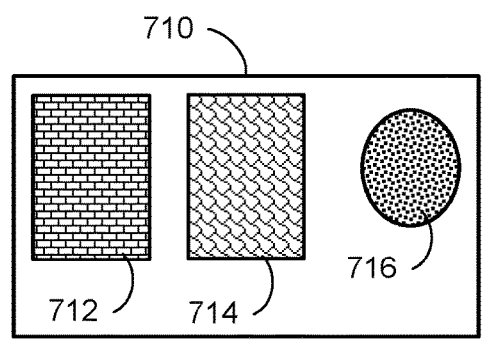

FIGS. 7A-7B illustrate aspects of a rendering operation under extended operating conditions. FIG. 7A illustrates a scene 700 that includes a brick-textured rectangle 702, covered by a roof tile-textured region 704, and two simple representations of trees, 706a and 706b. FIG. 7B shows the corresponding texture atlas 710, comprising UV spaces 712, 714, and 716. As can be seen in FIG. 7B, UV space 712 provides the brick texturing for rectangle 702; UV space 714 provides the roof tile texturing for region 704; and UV space 716 provides the leaf texturing for both of trees 706a and 706b.

In the event that scene 700 is to be rendered with lower resolution, such that edge padding is needed, it can be seen that UV space 716 is adjacent, in different uses, with either UV space 714 or UV space 716. Thus, in some exemplary implementations, the edge padding may optionally be dynamic, and tailored to a specific mesh projection. For example, when rendering a reduced resolution version of tree 706a, UV space 716 may be temporarily padded with texels from UV space 712, and then when rendering a reduced resolution version of tree 706b, the padding of UV space 716 may be replaced with padding using texels from UV space 714. This is a contrast with static padding that pads a texture atlas only a single time, and then remains fixed for all subsequent uses. In other exemplary static implementations, a unique instance of a UV shell may be created for each different padding set needed. For example, when rendering a reduced resolution version of trees 706a and 706b, UV space 716 may be duplicated, with one copy of UV space 716 padded with texels from UV space 712 (for rendering tree 706a), and the other copy of UV space 716 padded with texels from UV space 714 (for rendering tree 706b).

Figure 8A:
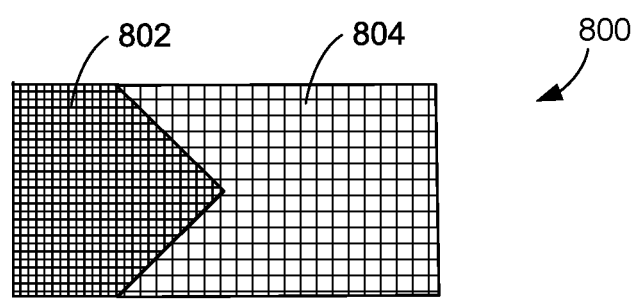
FIGS. 8A-8C illustrate an example set of adjoining regions in two dimensions (2D)
Figure 8B:
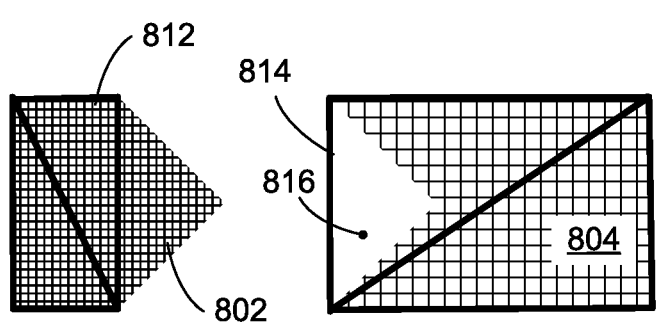
Figure 8C:
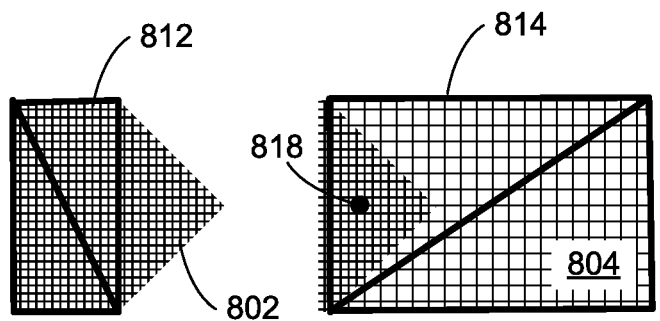

FIGS. 8A-8C illustrate a set of adjoining regions in 2D. FIG. 8A shows a 2D geometry 800 having two parts, pentagon 802 and adjoining section 804. In 2D, whenever two regions abut continuously (e.g., no gaps in the border), if one shape is convex, the other must be concave (and vice versa). FIG. 8B shows parts 802 and 804 with low resolution mesh projections 812 and 814, respectively, that are comprised of two triangles each. As a result of the low resolution, a convex portion of pentagon 802 is not mapped, and a concave region 816 of adjoining section 804 is lost when spanned by mesh projections 812 and 814. By padding concave region 816 of adjoining section 804 with texels from pentagon 802, the rendering of geometry 800 appears to a viewer with the appearance of a resolution that is higher than the actual mesh resolution. This padding is illustrated as padding region 818 in FIG. 8C.

Figure 9A:
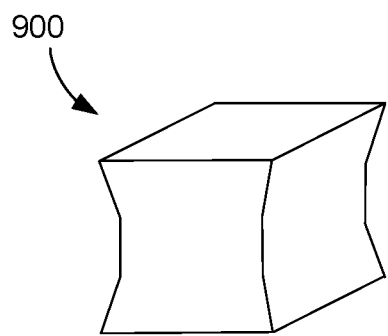
FIGS. 9A-9C illustrate an example set of adjoining regions in three dimensions (3D)
Figure 9B:
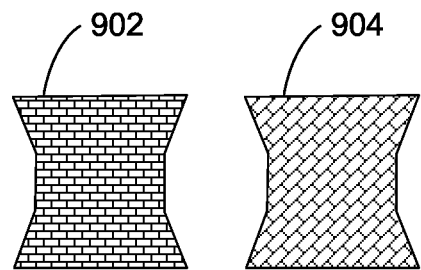
Figure 9C:
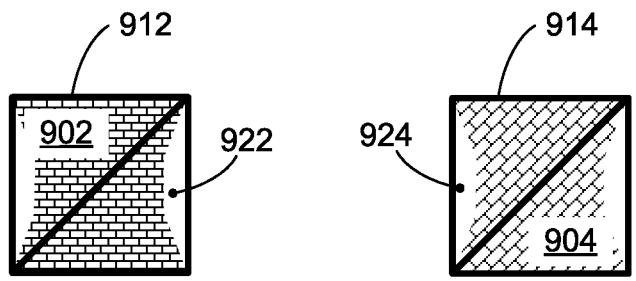

FIGS. 9A-9B illustrate a set of adjoining regions in 3D. FIG. 9A illustrates a 3D geometry 900, and FIG. 9B shows two textured surfaces 902 and 904 of geometry 900. Unlike in 2D, when a concave surface must abut a convex surface (when the border is continuous), in 3D it is possible for two concave surfaces to abut with a continuous border. FIG. 9C illustrates mesh projections 912 and 914 on two textured surfaces 902 and 904, respectively. Because of the concave shapes, there are two gaps 922 and 924 adjacent to where two textured surfaces 902 and 904 meet when rendered in 3D. Padding gap 922 with texels from textured surface 904, while simultaneously padding gap 924 with texels from textured surface 902 would result in an odd-looking arrangement. This is because at the lower mesh resolution, geometry 900 will lose the detail of its concavities, and be rendered as a straight-edge cube.

A suggested padding solution of the disclosure attempts to minimize the effect of the loss in resolution. The example solutions include: (1) padding both gaps 922 and 924 with texels from textured surface 904, which preserves the appearance of textured surface 902 being concave; (2) padding both gaps 922 and 924 with texels from textured surface 902, which preserves the appearance of textured surface 904 being concave; and (3) padding each of gaps 922 and 924 with texels from their own textured surfaces, 902 and 904 respectively, which results in a clean, straight-edge cube. Therefore, when a first UV shell is padded with the texels of a second UV shell (the adjacent UV shell, as defined by the 3D mesh), the second UV shell might not be padded (where the UV shells would meet in the rendering) with the texels of the first UV shell. Instead, the second UV shell may be padded, if at all, with its own interior texels.

FIG. 10A is a flow chart 1001 illustrating an exemplary operation of rendering a surface in a synthetic scene using a texture atlas. The operations illustrated in FIG. 10A may be performed by any processing unit, such as a computing node. A texture atlas comprising a first UV shell, a second UV shell, and gutter space is received 1003. A mesh comprising a plurality of polygons is received 1005. Operation 1007 determines whether a projection of a first polygon of the mesh onto the texture atlas, that includes a portion of the first UV shell, also includes a first portion of gutter space. Based at least on determining that the projection of the first polygon includes the first portion of gutter space, the first portion of gutter space is padded 1009 with texels from the second UV shell.

Figure 10B:
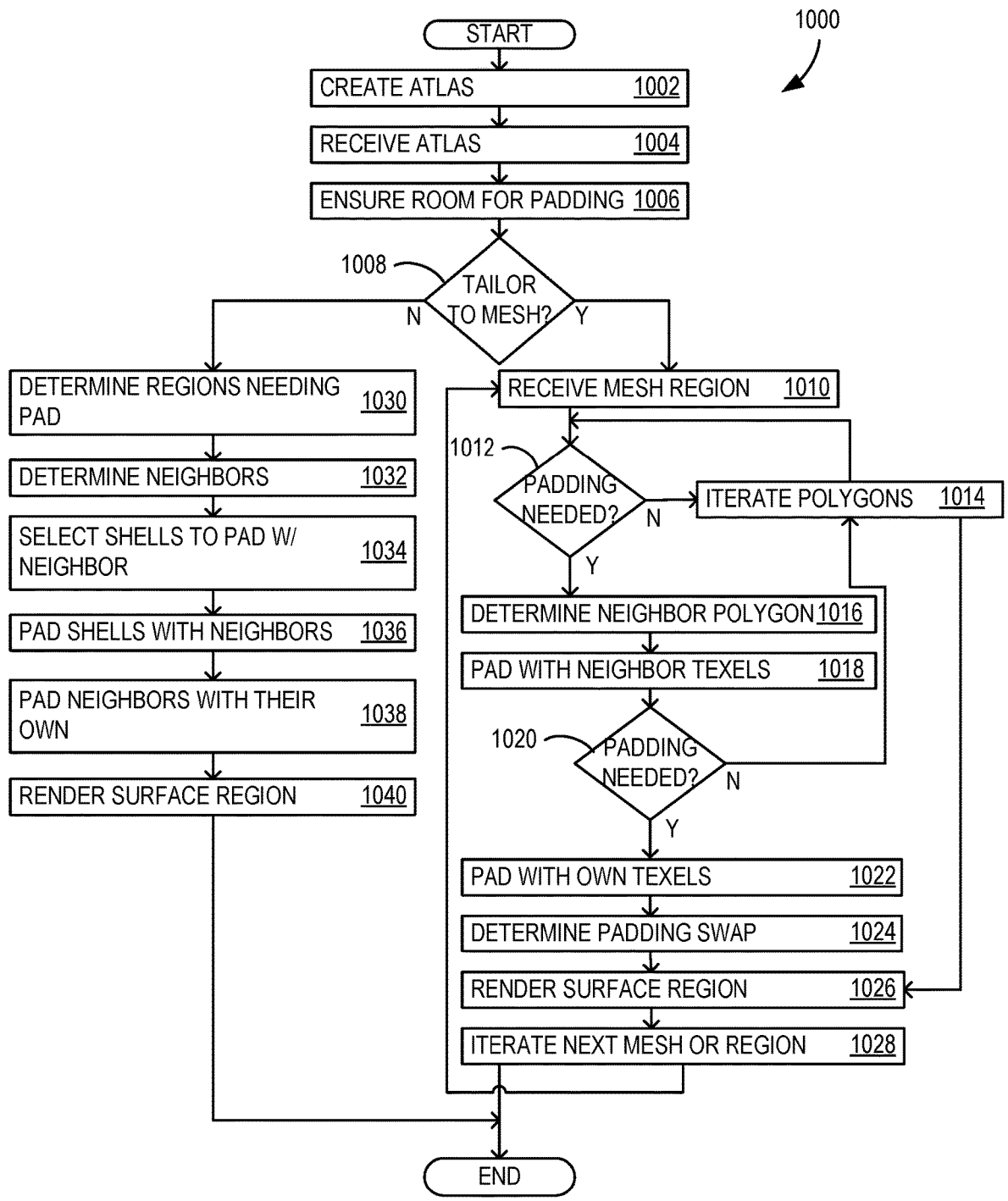

FIG. 10B is a flow chart 1000 illustrating an exemplary operation of rendering a surface in a synthetic scene using a texture atlas. The operations illustrated in FIG. 10B may be performed by any processing unit, such as a computing node. A texture atlas is created 1002 and received 1004 by the computing node. The texture atlas contains a plurality of UV shells, and gutter space. Operation 1006 ensures room for padding, such as by shifting the UV shells apart to ensure a minimum gutter space width of at least 1/64th of the UV shell dimensions. Decision operation 1008 reflects the possibility of using these operations for a one-time padding, such as when making a mipmap of a single object having multiple textured surfaces, or whether the padding is specific to a mesh, and tailored for specific polygons. The one-time padding uses operations 1030-1040, as described herein.

If tailoring the padding to a mesh, a mesh (or a region of a mesh, less than its entirety) is received 1010. The mesh comprises a plurality of polygons such as triangles or another type of polygon. The polygons each have multiple vertices. Adjoining polygons share at least one vertex, neighboring polygons share two vertices and the edge between. The need for padding is determined in operation 1012. This includes determining a projection of a first polygon of the mesh onto the texture atlas, that includes a portion of a first UV shell, and also includes a first portion of gutter space. The projection is the projection of the 3D polygon in the mesh onto the 3D texture atlas, using the UV coordinates in the polygon vertices. One example way is to determine whether a vertex of the (projection of the) first polygon lies outside the first UV shell. Another example way is to determine whether a straight edge of the polygon spans a concave portion of the boundary of the first UV shell. See vertex 330 of mesh projection 322 in FIG. 3D, and a vertex 330 of a mesh projection 322, and concave region 816 in FIG. 8B. If no padding is needed, operation 1014 iterates a search of the remaining polygons in the received mesh, and moves to operation 1026 when finished.

If padding is needed, then the neighboring polygon is found in operation 1016, using the shared vertices. This enables locating the neighboring UV shell by determining whether a projection of the neighboring polygon (e.g., a second polygon that is adjacent in the mesh to the first polygon) onto the texture atlas includes a portion of the second UV shell. At this point, based at least on determining that the projection of the first polygon includes gutter space and identifying the neighboring shell, operation 1018 pads the first portion of gutter space with texels from the second UV shell. Several embodiments exist for determining the extent of the padding. The first polygon may be used as a measure, with the padding extending all the way out to the most distant end of the polygon (e.g., at an outside vertex), or the padding dimensions may be a fraction of the UV shell dimension, as described previously. Additionally, a fixed minimum padding width may be used, either with the fractional dimension (as a minimum), or alone. Also, padding may be stretched out half way through the gutter space, to the UV shell that is adjacent in the atlas. This half-way point permits the adjacent UV shell to have its own padding of equal width.

Decision operation 1020 determines whether the second polygon (e.g., the neighbor of the first polygon) also indicates a need for padding. This can be accomplished by determining whether the projection of the second polygon onto the texture atlas also includes a portion of gutter space (a second portion of gutter space, different that the first portion of gutter space included within the first polygon). One case is that it does not, and operation 1014 continues searching the remaining polygons. If, however, padding is needed, the second UV shell may be padded with its own texels (e.g., the second UV shell is padded with texels from the second UV shell).

Operation 1024 determines whether it may be preferable to swap which of the first UV shell and second UV shell is padded with the neighboring texels, and which is padded with its own. The concavity and convexity of the UV shell boundaries at the border of the first and second polygons may be used as a determining factor, for example, the convex side is padded with its own texels, or instead the concave side is padded with its own texels. The surface, such as of an entire synthetic scene or just a single object or portion is rendered in operation 1036, and the next incoming mesh or region is addressed by iteration with operation 1028. If the iteration is ongoing, operation 1010 repeats.

It is possible, that while iterating through operations 1010 through 1028, the first UV shell may be revisited with another polygon from another mesh region. This can occur if a single UV shell is used for multiple differently-located surfaces within a scene or a multi-faceted object. In such a situation, the region used for initially padding the first UV shell (e.g., based upon the first polygon), using an initial set of neighboring texels (e.g., based on the second polygon), may be over-written with subsequent padding (based on a third polygon that includes the first UV shell and gutter space) using a new set of neighboring texels (e.g., based on a fourth polygon that is a neighbor of the third polygon in the mesh).

Now, turning to the one-time padding operations, the regions needing padding are determined in operation 1030. This may be accomplished by identifying convex or concave surfaces. Neighbors are determined in operation 1032, possibly using connectivity information in the high resolution mesh. Operation 1034 selects which of the UV shell boundaries are to be padded with neighboring texels. In some embodiments, these are the concave boundaries, whereas in other embodiments, these are the convex boundaries. Other decision criteria, such as based on viewer feedback of a preferable scheme, may be used. The padding is carried out in operation 1036, using some of the width criteria described for operation 1018. The opposing side of the borders are padded with their own texels, if any padding is needed, in operation 1038. The texture atlas is ready for use to render surfaces in operation 1040.

Additional Examples

Some examples are directed to a system for rendering a surface in a synthetic scene, that comprises: a processor; and a computer-readable medium storing instructions that are operative when executed by the processor to: receive a texture atlas into the medium, the texture atlas comprising a first UV shell, a second UV shell, and gutter space; receive a mesh into the medium, the mesh comprising a plurality of polygons; determine whether a projection of a first polygon of the mesh onto the texture atlas, that includes a portion of the first UV shell, also includes a first portion of gutter space; and responsive to determining that the projection of the first polygon includes the first portion of gutter space, pad the first portion of gutter space with texels from the second UV shell.

Some examples are directed to a method for rendering a surface in a synthetic scene comprises: receiving a texture atlas into the medium, the texture atlas comprising a first UV shell, a second UV shell, and gutter space; receiving a mesh into the medium, the mesh comprising a plurality of polygons; determining whether a projection of a first polygon of the mesh onto the texture atlas, that includes a portion of the first UV shell, also includes a first portion of gutter space; and based at least on determining that the projection of the first polygon includes the first portion of gutter space, padding the first portion of gutter space with texels from the second UV shell.

Some examples are directed to one or more computer storage devices having computer-executable instructions stored thereon for rendering a surface in a synthetic scene, which, on execution by a computer, cause the computer to perform operations comprising: receiving a texture atlas into the medium, the texture atlas comprising a first UV shell, a second UV shell, and gutter space; receiving a mesh into the medium, the mesh comprising a plurality of polygons; determining whether a projection of a first polygon of the mesh onto the texture atlas, that includes a portion of the first UV shell, also includes a first portion of gutter space; responsive to determining that the projection of the first polygon includes the first portion of gutter space, determining whether a projection of a second polygon of the mesh onto the texture atlas, the second polygon being adjacent in the mesh to the first polygon, includes a portion of the second UV shell; and based at least on determining that the projection of the second polygon includes a portion of the second UV shell, padding the first portion of gutter space with texels from the second UV shell.

Alternatively or in addition to the other examples described herein, some examples include any combination of the following: the plurality of polygons comprises a plurality of triangles; determining whether a polygon projected onto the first UV shell includes gutter space comprises determining whether a vertex of the polygon lies outside the first UV shell; determining whether a projection of a second polygon of the mesh onto the texture atlas, the second polygon being adjacent in the mesh to the first polygon, includes a portion of the second UV shell; determining whether the projection of the second polygon onto the texture atlas also includes a second portion of gutter space; and responsive to determining that the projection of the second polygon includes the second portion of gutter space, padding the second portion of gutter space with texels from the second UV shell; the padding extends to fill the projection of the first polygon onto the texture atlas; the padding extends outward from a boundary of the first UV shell, based on a dimension of the UV shell; after padding the first portion of gutter space with texels from the second UV shell, determining whether a projection of a third polygon of the mesh onto the texture atlas, that includes a portion of the first UV shell, also includes a third portion of gutter space; responsive to determining that the projection of the third polygon includes the third portion of gutter space, determining whether the projection of a fourth polygon of the mesh onto the texture atlas, the fourth polygon being adjacent in the mesh to the third polygon, includes a portion of a third UV shell of the texture atlas; and responsive to determining that the projection of the third polygon includes the third UV shell, padding the third portion of gutter space with texels from the third UV shell; and the third portion of gutter space overlaps the first portion of gutter space.

While the aspects of the disclosure have been described in terms of various examples with their associated operations, a person skilled in the art would appreciate that a combination of operations from any number of different examples is also within scope of the aspects of the disclosure.

Example Operating Environment

Figure 11:
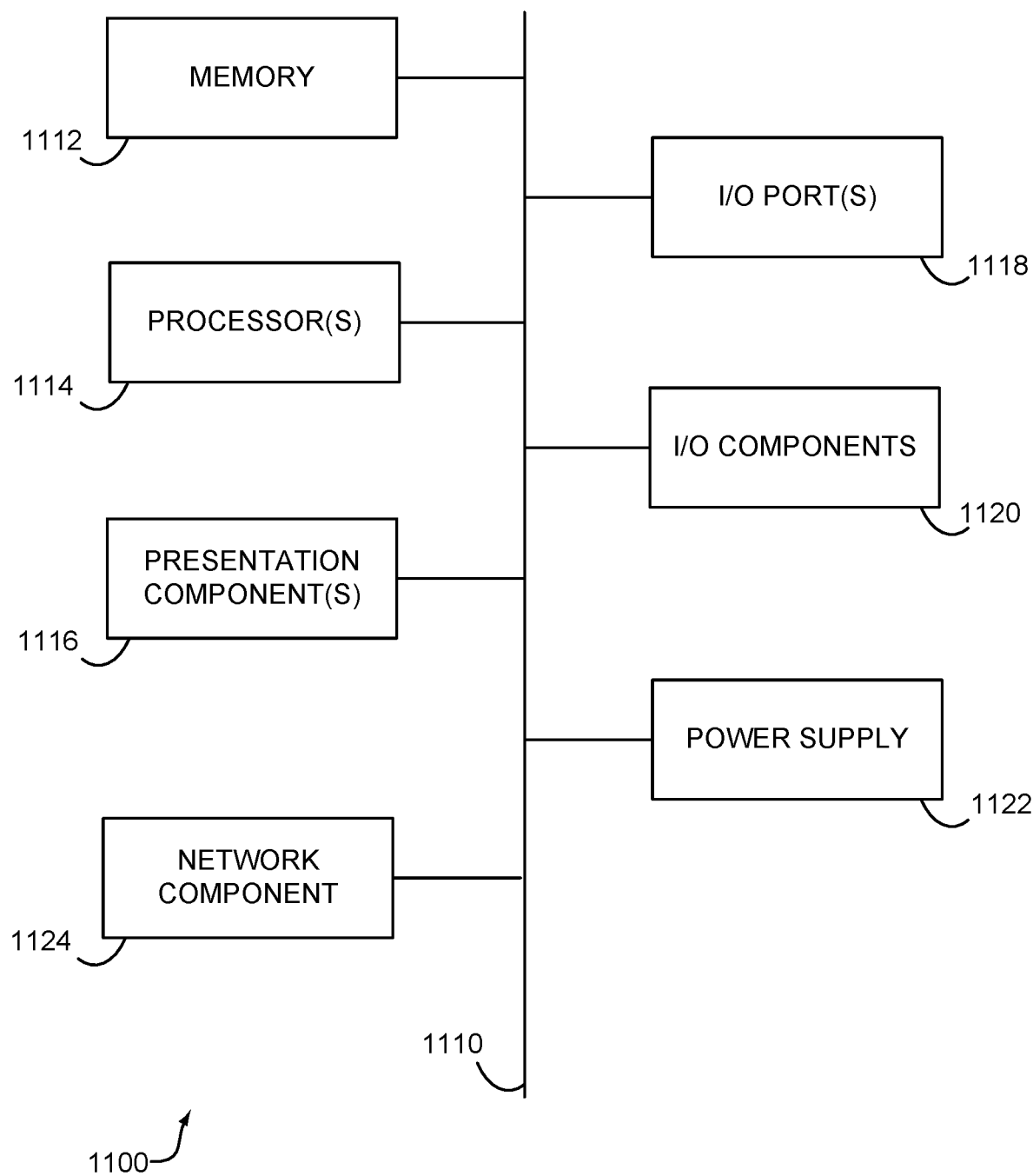
FIG. 11 is an exemplary block diagram illustrating an operating environment for a computing device suitable for implementing various aspects of the disclosure.

FIG. 11 is a block diagram of an example computing device 1100 for implementing aspects disclosed herein, and is designated generally as computing device 1100. Computing device 1100 is one example of a suitable computing environment and is not intended to suggest any limitation as to the scope of use or functionality of the invention. Neither should the computing device 1100 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments, where tasks are performed by remote-processing devices that are linked through a communications network. For example, a distributed computing environment may host cloud synthetics services. Some embodiments of synthetics services may provide synthetic 3D environments as well as rendering a surface in a synthetic scene.

Computing device 1100 includes a bus 1110 that directly or indirectly couples the following devices: memory 1112, one or more processors 1114, one or more presentation components 1116, input/output (I/O) ports 1118, I/O components 1120, a power supply 1122, and a network component 1124. Computing device 1100 should not be interpreted as having any dependency or requirement related to any single component or combination of components illustrated therein. While computing device 1100 is depicted as a seemingly single device, multiple computing devices 1100 may work together and share the depicted device resources. For instance, memory 1112 may be distributed across multiple devices, processor(s) 1114 may provide housed on different devices, and so on.

Bus 1110 represents what may be one or more busses (such as an address bus, data bus, or a combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and the references herein to a "computing device."

Memory 1112 may include any of the computer-readable media discussed herein. Memory 1112 may be used to store and access instructions configured to carry out the various operations disclosed herein. In some examples, memory 1112 includes computer storage media in the form of volatile and/or nonvolatile memory, removable or non-removable memory, data disks in virtual environments, or a combination thereof.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flowcharts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100.

Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways.

Ports 1118 allow computing device 1100 to be logically coupled to other devices including I/O components 1120, some of which may be built in. Examples I/O components 1120 include, for example but without limitation, a microphone, keyboard, mouse, joystick, game pad, satellite dish, scanner, printer, wireless device, etc.

In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, the network component 1124 is operable to communicate data over public, private, or hybrid (public and private) using a transfer protocol, between devices wirelessly using short range communication technologies (e.g., near-field communication (NFC), BLUETOOTH® branded communications, or the like), or a combination thereof.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The embodiments illustrated and described herein as well as embodiments not specifically described herein but within the scope of aspects of the claims constitute exemplary means for receiving a texture atlas into the medium, the texture atlas comprising a first UV shell, a second UV shell, and gutter space; exemplary means for receiving a mesh into the medium, the mesh comprising a plurality of polygons; exemplary means for determining whether a projection of a first polygon of the mesh onto the texture atlas, that includes a portion of the first UV shell, also includes a first portion of gutter space; and exemplary means for, based at least on determining that the projection of the first polygon includes the first portion of gutter space, padding the first portion of gutter space with texels from the second UV shell.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for rendering a surface in a synthetic scene, the system comprising:
   a processor; and
   a computer-readable medium storing instructions that are operative when executed by the processor to:
      receive a texture atlas comprising a first UV shell, a second UV shell, and gutter space;
      receive a mesh comprising a plurality of polygons;
      determine whether a projection of a first polygon of the mesh onto the texture atlas, that includes a portion of the first UV shell, also includes a first portion of gutter space;
      based at least on determining that the projection of the first polygon includes the first portion of gutter space, determine a need to pad the first portion of the gutter space;
      based on at least on determining the need to pad the first portion of the gutter space, identify a second UV shell as a neighboring UV shell; and
      pad the first portion of gutter space with texels from the second UV shell.

2. The system of claim 1 wherein the plurality of polygons comprises a plurality of triangles.

3. The system of claim 1 wherein the instructions are further operative to:
   determine whether a projection of a second polygon of the mesh onto the texture atlas, the second polygon being adjacent in the mesh to the first polygon, includes a portion of the second UV shell.

4. The system of claim 3 wherein the instructions are further operative to:
   determine whether the projection of the second polygon onto the texture atlas also includes a second portion of gutter space; and
   responsive to determining that the projection of the second polygon includes the second portion of gutter space, pad the second portion of gutter space with texels from the second UV shell.

5. The system of claim 1 wherein the pad extends to fill the projection of the first polygon onto the texture atlas.

6. The system of claim 1 wherein the instructions are further operative to:
   after padding the first portion of gutter space with texels from the second UV shell, determine whether a projection of a third polygon of the mesh onto the texture atlas, that includes a portion of the first UV shell, also includes a third portion of gutter space; and
   based at least on determining that the projection of the third polygon includes the third portion of gutter space, padding the third portion of gutter space with texels from a third UV shell of the texture atlas.

7. The system of claim 6 wherein the third portion of gutter space overlaps the first portion of gutter space.

8. A method for rendering a surface in a synthetic scene, the method comprising:
   receiving a texture atlas comprising a first UV shell, a second UV shell, and gutter space;
   receiving a mesh comprising a plurality of polygons;
   determining whether a projection of a first polygon of the mesh onto the texture atlas, that includes a portion of the first UV shell, also includes a first portion of gutter space; and
   based at least on determining that the projection of the first polygon includes the first portion of gutter space, determining a need to pad the first portion of the gutter space;

based on at least on determining the need to pad the first portion of the gutter space, identifying a second UV shell as a neighboring UV shell; and padding the first portion of gutter space with texels from the second UV shell.

9. The method of claim 8 further comprising determining that a second polygon neighboring the first polygon needs padding based on determining a projection of the second polygon onto the texture atlas also includes a portion of gutter space different that the first portion of gutter space; and padding the second UV shell with texels from the second UV shell.

10. The method of claim 8 wherein determining whether a polygon projected onto the first UV shell includes gutter space comprises determining whether a vertex of the polygon lies outside the first UV shell.

11. The method of claim 8 further comprising:
determining whether a projection of a second polygon of the mesh onto the texture atlas, the second polygon being adjacent in the mesh to the first polygon, includes a portion of the second UV shell.

12. The method of claim 11 further comprising:
determining whether the projection of the second polygon onto the texture atlas also includes a second portion of gutter space; and based at least on determining that the projection of the second polygon includes the second portion of gutter space, padding the second portion of gutter space with texels from the second UV shell.

13. The method of claim 8 wherein the padding extends to fill the projection of the first polygon onto the texture atlas.

14. The method of claim 8 wherein the padding extends outward from a boundary of the first UV shell, based on a dimension of the first UV shell.

15. The method of claim 8 further comprising:
after padding the first portion of gutter space with texels from the second UV shell, determining whether a projection of a third polygon of the mesh onto the texture atlas, that includes a portion of the first UV shell, also includes a third portion of gutter space;

based at least on determining that the projection of the third polygon includes the third portion of gutter space, determining whether the projection of a fourth polygon of the mesh onto the texture atlas, the fourth polygon being adjacent in the mesh to the third polygon, includes a portion of a third UV shell of the texture atlas; and based at least on determining that the projection of the third polygon includes the third UV shell, padding the third portion of gutter space with texels from the third UV shell.

16. The method of claim 15 wherein the third portion of gutter space overlaps the first portion of gutter space.

17. One or more computer storage devices having computer-executable instructions stored thereon for rendering a surface in a synthetic scene, which, on execution by a computer, cause the computer to perform operations comprising:

receiving a texture atlas comprising a first UV shell, a second UV shell, and gutter space;

receiving a mesh comprising a plurality of polygons;

determining whether a projection of a first polygon of the mesh onto the texture atlas, that includes a portion of the first UV shell, also includes a first portion of gutter space;

based at least on determining that the projection of the first polygon includes the first portion of gutter space, determining whether a projection of a second polygon of the mesh onto the texture atlas, the second polygon being adjacent in the mesh to the first polygon, includes a portion of the second UV shell;

based at least on determining that the projection of the second polygon includes the first portion of the gutter space, determining a need to pad the first portion of the gutter space;

based on at least on determining the need to pad the first portion of the gutter space, identifying a second UV shell as a neighboring UV shell; and padding the first portion of gutter space with texels from the second UV shell.

18. The one or more computer storage devices of claim 17 wherein the plurality of polygons comprises a plurality of triangles.

19. The one or more computer storage devices of claim 17 further comprising:

determining whether the projection of the second polygon onto the texture atlas also includes a second portion of gutter space; and based at least on determining that the projection of the second polygon includes the second portion of gutter space, padding the second portion of gutter space with texels from the second UV shell.

20. The one or more computer storage devices of claim 17 further comprising:

after padding the first portion of gutter space with texels from the second UV shell, determining whether a projection of a third polygon of the mesh onto the texture atlas, that includes a portion of the first UV shell, also includes a third portion of gutter space, wherein the third portion of gutter space overlaps the first portion of gutter space;

based at least on determining that the projection of the third polygon includes the third portion of gutter space, determining whether the projection of a fourth polygon of the mesh onto the texture atlas, the fourth polygon being adjacent in the mesh to the third polygon, includes a portion of a third UV shell of the texture atlas; and based at least on determining that the projection of the third polygon includes a portion of the third UV shell, padding the third portion of gutter space with texels from the third UV shell.

* * * * *